Sept. 13, 1932.  F. A. SEIBERLING ET AL  1,877,600

PNEUMATIC TIRE

Filed May 6, 1931

Inventor
F. A. Seiberling, and
W. S. Wolfe,
By Robert M. Pierson,
Attorney

Patented Sept. 13, 1932

1,877,600

UNITED STATES PATENT OFFICE

FRANK A. SEIBERLING, OF AKRON, AND WILLIAM S. WOLFE, OF FAIRLAWN, OHIO, ASSIGNORS TO SEIBERLING RUBBER COMPANY, OF BARBERTON, OHIO, A CORPORATION OF DELAWARE

PNEUMATIC TIRE

Application filed May 6, 1931. Serial No. 535,372.

This invention relates to resilient tires, including those having an anti-skidding rubber tread formation, and especially pneumatic tires having that feature.

One of our principal objects is to provide the tread with a second set of anti-skid projections developed by the wearing away of the original ones. A further object is to provide a tread of increased depth in proportion to the cross-sectional width of the tire, without incurring the usual penalty of tread separation and other disadvantages, and thus to obtain longer tread wear. Still further objects are to develop successive sets of anti-skid projections when the original tread surface has worn away, to make this development substantially continuous or without interruption so that as one set is obliterated the next one becomes available, and to accomplish such result with the minimum tendency toward cupping or unevenness of wear.

In the ordinary non-skid pneumatic tire, experience has shown that there is a definite limit to which the relative height of the original tread bars or blocks may be extended without producing rapid and in many cases uneven tread wear and cracking. The practicable thickness of the tread is further limited by its tendency to overheat and to separate from the carcass or tire foundation, due largely to the operation of the so-called traction wave caused by flattening of the flexible tread wall when the tire is running under load.

Our invention provides a novel application of transverse holes or perforations in the tire tread. While perforations have heretofore been employed in pneumatic tires to ventilate the tread and permit its original thickness to be increased, our present invention greatly improves upon prior accomplishments in this respect and has resulted in prolonging the average life of tires and their retention of anti-skidding qualities far beyond anything heretofore known in the art.

Figure 1:
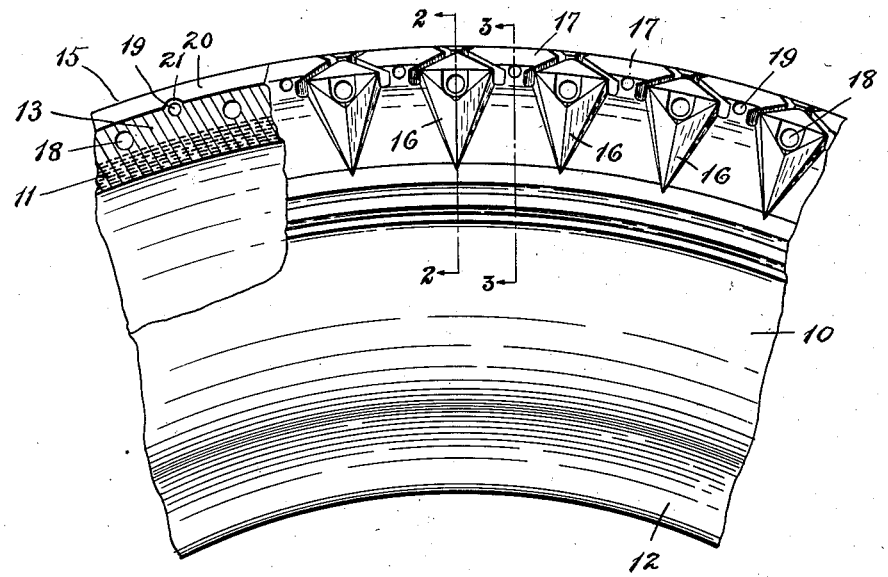

Of the accompanying drawing, Fig. 1 is a side elevation, partly in section, showing a segment of a pneumatic tire casing having a rubber tread embodying our invention in a preferred form.

Figure 2:
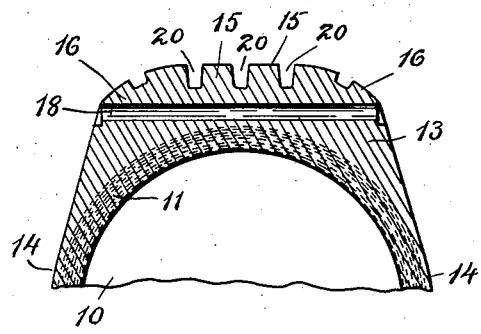
Figure 3:
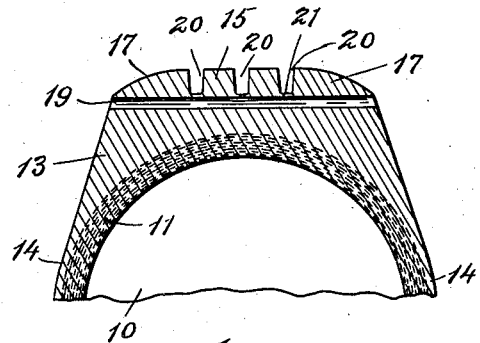

Figs. 2 and 3 are cross-sections on the lines 2—2 and 3—3 of Fig. 1.

In the drawing, 10 is a pneumatic tire casing adapted to receive the ordinary inflatable inner tube and to be mounted upon a suitable rim. 11 is the flexible tire carcass or foundation composed of the usual bias-laid rubberized cord plies and having its edges formed with rim-engaging beads 12.

13 is the rubber tread or wearing portion united to the carcass 11 by vulcanization and extended toward the beads to form side-wall coverings 14. The usual thin layer of cushion rubber (not separately shown) may be interposed between the carcass and the body of the tread, and the ordinary breaker strip or strips may be employed if desired. The tread is molded with non-skid projections which may have any suitable form such as a pair of circumferential ribs 15 occupying the middle region, together with rows of blocks 16 extending somewhat down the sides, and blocks 17 of different shape alternating therewith and terminating short of the ends of blocks 16 laterally of the tire, in the tread margins. The original height of these projections may conform to the usual standards.

18, 18 are a series of circumferentially-spaced holes or apertures like those heretofore employed in certain commercial tires, transversely formed in the rubber tread 13, with their end portions located in the marginal tread projections 16 and terminating in the shoulder faces of said projections, in the embodiment here illustrated, said holes preferably extending clear through the tread from side to side. These holes are located at equal radial distances from the central tire or wheel axis, with their middle portions in the base of the rubber tread closely adjacent to the tread wall of the carcass 11, and they are conveniently formed by straight mold pins.

The holes 18, as well as the additional ones 19 hereinafter described, act as absorbers of the outer portion of the traction wave which is formed in the whole tread wall by bending and flattening thereof against the ground when the tire is running under load, in that they limit the circumferential extension of the intervening solid portions of the tread rubber within the zone of said holes and to some extent in the solid regions radially adjacent to the holes. This phenomenon of the traction wave, involving the whole tire wall in the region of flexure, is peculiar to pneumatic tires and has been a fruitful cause of tread separation in ordinary forms of pneumatic tires, especially with treads of unusual depths. In solid tires vulcanized to a rigid base the flattening of the tread surface is wholly due to compression thereof accompanied by lateral displacement of the rubber, and does not involve bending or flexure of the tread as a whole. When such tires are of laterally perforated or cellular construction it is found that the perforations have to be of relatively large diameter, comparatively few per unit of tire length and confined to a single row in order to avoid early destruction of the tire caused by breaking down of the solid portions between the cells.

In the pneumatic tire to which our invention pertains, where a second row of holes is provided as hereinafter pointed out, experience has shown that for a tire of 6-inch cross-section a circumferential spacing of the holes 18 of the order of approximately 1¾ inches between centers affords good results. For tires of smaller section the spacing may be slightly reduced and for larger ones it may be increased,—the spacing in a 9.75 inch tire for example being about 2½ inches. The spacing range for the various sizes is of the order of approximately 1½ to 3 inches in each row of holes. While some variation is permissible, a greatly wider spacing tends to produce tread separation due to building up of the traction wave in the intervening solid portions, and a materially shorter spacing induces objectionable cupping at the trailing ends of the transversely-extending projections which are left when the tread is worn through to the holes 18.

We have further shown a second set of transverse holes or apertures 19 in the tread 13, having the same angular spacing as the holes 18 and alternating with the latter throughout the circumference of the tire but spaced at a greater radial distance from the central tire axis so as to be radially staggered with reference to said holes 18. These holes, like the ones 18, we prefer to extend clear through the tread, from side to side thereof, as shown, their end portions being located in the marginal tread projections 17 and terminating in the shoulder faces of said projections, in the illustrated embodiment.

The exact direction and extent of penetration of the holes 18 and 19 is subject to variation, so long as they extend in a general transverse or lateral direction and so long as the holes extending into the tread from both sides are collectively effective as wave absorbers substantially throughout the width of the tread. Extending them straight across and clear through from side to side facilitates the manufacture of the tire, and a hole open at both ends is less likely to cause breaking down of the adjacent rubber than one having a closed end.

We have found that the additional set of tread holes 19, placed substantially as described, permits a marked increase in the depth or thickness of the rubber tread without creating the disadvantages of tread separation, overheating, etc. which would ordinarily follow such an increase. They are effective to a large extent in absorbing or breaking up the traction wave in the outer zone of the tread. We prefer to make these outer holes 19 of smaller diameter than the inner ones 18 to minimize arching of the rubber over said holes 18 when it has worn thin and because, when the tread has been worn through to expose the outer holes, the resulting transverse projections, having a greater depth of tread rubber under them, will be more flexible than the projections resulting from the wearing away to the inner set of holes and hence more subject to cupping at their ends, which effect is minimized by the presence of relatively shallower transverse grooves. Inner holes having a diameter of the order of $\tfrac{7}{32}$ to $\tfrac{1}{4}$ of an inch and outer ones of the order of $\tfrac{5}{32}$ to $\tfrac{3}{16}$ of an inch have been found to give good service in tires of 6-inch section, but these dimensions are subject to some variation, the holes being preferably slightly larger in the larger tires and slightly smaller in the smaller ones. The invention is not wholly restricted to making the inner and outer holes of different diameters nor to the exact spacing above referred to nor to the use of two rows of holes. The described arrangement results in the development in the tire tread of successive sets of transversely-extending anti-skid projections after the original molded projections 15, 16 and 17 have worn away. The two rows of holes further provide improved ventilation and cooling of the tire in service. It will be seen that the outer holes 19, terminating in the marginal projections 17, have their ends staggered with relation to the ends of the inner ones 18, terminating in the projections 16, and when the members of a pair of inlying or outlying projections 17 or 16 are opposite each other in the tread as shown in Figs. 2 and 3, the holes 18 will be longer than the holes 19. This combination of features aids in obtaining the proper spacing of holes in the two rows and promotes evenness of tread wear, especially when the outer holes are of smaller diameter than the inner ones, as shown and described.

As indicated in the drawing, the outer sides of the holes 19 in the outer row are located approximately at the radial level of the lowest portion of the bottoms of the longitudinal grooves 20 which separate the molded ribs 15 from each other and from the molded marginal blocks 16 and 17, and hence at the bases of these tread projections, and they are originally covered by shallow arches 21 of tread rubber which are quickly worn through to expose the upper sides of the holes 19 when the molded projections have been substantially worn away. Accordingly the outer holes 19 are exposed by the wearing down of the original tread projections. This feature is valuable and useful regardless of whether the inner row of holes 18 is present, and in some cases we may omit the latter.

Where two rows of holes are employed as set forth, the inner sides of the outer holes 19 are preferably located, as shown, at approximately the same level or radial distance from the central axis of the tire as the outer sides of the inner holes 18, so that when the outer holes or grooves have been substantially obliterated by tread wear, the exposure of the inner ones will begin.

Thus our invention, in its described embodiment, through wearing away of the tread, develops successive sets of transversely-extending anti-skid projections, whose marginal portions are composed of portions of the marginal tread projections 17 and 16, and hence are narrower and more flexible than the original marginal projections, the first set extending longitudinally between the holes 19 in the outer row, which divide the middle tread rubber and the original marginal projections 17 at the new wearing surface to form said additional projections, and the second set extending in like manner between the holes 18 in the inner row, to divide the middle tread rubber and the marginal projections 16 at said surface. Also, in the preferred embodment, this development of the successive sets is continuous or uninterrupted by any smooth-tread stage, and it occurs in three anti-skid stages when the tire is originally molded with gripping projections as described. Tread separation is avoided in the manner indicated by the action of the transverse apertures in breaking up the traction wave, both rows of apertures being effective in this respect so long as the outer ones exist, and the inner ones being thereafter effective until obliterated. This is accomplished with the minimum amount of cupping or unevenness of tread wear. As a consequence, the average serviceable life of tires embodying this invention greatly exceeds anything heretofore known in the art where the qualities are the same in other respects and the conditions of use are alike.

While we have described one form of embodiment, it will be understood that the invention is not wholly limited to this form but many variations may be made within the scope of the claims, particularly in respect to the size and spacing of the holes, their exact direction and extent, and other details.

We claim:

1. A pneumatic tire comprising a flexible carcass and a rubber tread united therewith, said tread being formed with anti-skid projections separated by grooves and with circumferentially spaced holes embracing the width of the tread and crossing under the projections and grooves, said holes having their outer sides substantially at the base level of said projections.

2. A pneumatic tire comprising a flexible carcass and a rubber tread united therewith, said tread being formed with apertures extending transversely inward from its side faces and with tread projections and circumferentially elongated separating grooves, both located radially over said apertures, the grooves having their bottoms between the apertures extending to the level of the outer sides of the apertures so as continuously to provide successive anti-skid surfaces, first by means of the original tread projections and then, without interruption, by means of the rubber between the apertures after said original projections have worn away.

3. A resilient tire including a rubber wearing portion, said portion being originally formed with anti-skid projections separated by recesses and with transverse apertures at the bases of said projections, and relatively thin, outwardly convex, rubber arches overlying said apertures at the bottoms of said recesses.

4. A pneumatic tire comprising a flexible carcass and a rubber tread united therewith, said tread being formed with longitudinally-extending anti-skid ribs separated by longitudinal grooves, and with circumferentially-extending transverse holes in the body of said tread, whose upper sides extend substantially to the level of the bottom portions of the grooves intervening between said holes, and relatively-thin rubber arches overlying said holes at the bottoms of the grooves and raised above said intervening bottom portions thereof.

5. A pneumatic tire comprising a flexible carcass having a rubber tread united therewith, said tread being formed with transverse holes alternately placed around the tire in radially staggered relation in inner and outer rows and collectively effective as wave-absorbers substantially throughout the width of the tread, for developing successive sets of transverse anti-skid projections as the tread wears away, the holes in the outer row being circumferentially separated by solid rubber portions overlying the holes in the adjacent inner row, the tread being also formed with longitudinal grooves having thin rubber arches at their bottoms overlying said holes in the outer row.

6. A resilient tire including a rubber tread formed with an original set of marginal anti-skid projections, certain of which terminate laterally short of those with which they alternate, and with two rows of transverse apertures alternating at different levels and formed in said marginal projections, the apertures in the two rows terminating in alternate projections and having laterally staggered ends.

7. A pneumatic tire comprising a flexible carcass and a rubber tread thereon formed with an original set of marginal anti-skid projections, alternate ones of which extend laterally farther out than the next adjacent ones, and with an outer row of transverse apertures of relatively small diameter having their ends located at the ends of certain of said projections and an inner row of longer transverse apertures of larger diameter having their ends located at the ends of the farther-extending projections between those containing the outer row of apertures.

In witness whereof we have hereunto set our hands this 5th day of May, 1931.

FRANK A. SEIBERLING.
WILLIAM S. WOLFE.